US012661941B2

(12) United States Patent
Hogue

(10) Patent No.: US 12,661,941 B2
(45) Date of Patent: Jun. 23, 2026

(54) HYDRAULIC HITCH POSITIONING SYSTEM

(71) Applicant: Roger D. Hogue, Halls, TN (US)

(72) Inventor: Roger D. Hogue, Halls, TN (US)

( * ) Notice: Subject to any disclaimer, the term of this patent is extended or adjusted under 35 U.S.C. 154(b) by 161 days.

(21) Appl. No.: 18/740,574

(22) Filed: Jun. 12, 2024

(65) Prior Publication Data

US 2025/0340091 A1     Nov. 6, 2025

Related U.S. Application Data

(60) Provisional application No. 63/641,455, filed on May 2, 2024.

(51) Int. Cl.
B60D 1/44 (2006.01)
B60D 1/48 (2006.01)

(52) U.S. Cl.
CPC ..................................... B60D 1/44 (2013.01)

(58) Field of Classification Search
CPC . B60D 1/44; B60D 1/485; B60D 1/54; B60D 1/246
USPC .............. 280/468, 467, 470, 471, 495, 496; 278/96.3; 172/324
See application file for complete search history.

(56) References Cited

U.S. PATENT DOCUMENTS

| | | | | |
|---|---|---|---|---|
| 1,462,930 A | * | 7/1923 | Bollman | B62D 13/00 |
| | | | | 280/471 |
| 2,290,003 A | * | 7/1942 | Tarbell | A01B 15/20 |
| | | | | 172/324 |

| | | | | |
|---|---|---|---|---|
| 2,557,471 A | * | 6/1951 | Romig | B60D 1/26 |
| | | | | 280/468 |
| 6,634,666 B2 | * | 10/2003 | Shilitz | B60D 1/36 |
| | | | | 280/470 |
| 7,975,776 B2 | | 7/2011 | Chimento et al. | |
| 9,688,110 B2 | | 6/2017 | Scharmüller et al. | |
| 11,369,053 B2 | | 6/2022 | Kosmicki et al. | |
| 11,752,815 B2 | | 9/2023 | McAllister | |
| 11,813,909 B2 | | 11/2023 | Strand | |

(Continued)

FOREIGN PATENT DOCUMENTS

| | | | | |
|---|---|---|---|---|
| CN | 112193001 A | * | 1/2021 | B60D 1/44 |
| ES | 1298766 U | | 3/2023 | |

(Continued)

*Primary Examiner* — Anne Marie M Boehler
(74) *Attorney, Agent, or Firm* — HULSEY P.C.

(57) ABSTRACT

A hydraulic hitch positioning system for positioning a hitch of a pulled device relative to a pulling vehicle. The hydraulic hitch positioning system includes first frames and second frames connected to anchors. The first frames include a first slider. The second frames include a second slider. The second slider encompasses a hydraulic cylinder and hitch connecting section. The hydraulic hitch positioning system includes a chain and sprocket assembly connecting the first slider and second slider. The movement of the second slider is transmitted to the first slider through the chain and sprocket assembly, causing the first slider to move in the opposite direction to the second slider at twice the distance. The arrangement results in total movement of the hitch connecting section three times the stroke of the hydraulic cylinder. The hitch connecting section can be positioned at any point between the extreme limits of the hydraulic hitch positioning system.

20 Claims, 2 Drawing Sheets

(56) References Cited

U.S. PATENT DOCUMENTS

| 2022/0212507 | A1 | 7/2022 | Graham et al. |
| 2023/0064854 | A1 | 3/2023 | Zgrablic et al. |

FOREIGN PATENT DOCUMENTS

| WO | WO2019148237 | A1 | 1/2018 |
| WO | WO2021219353 | A1 | 11/2021 |

* cited by examiner

HYDRAULIC HITCH POSITIONING SYSTEM

CROSS-REFERENCE TO RELATED APPLICATIONS

The present application claims the benefit of U.S. Provisional Application No. 63/641,455, filed May 2, 2024; which is incorporated herein in its entirety and referenced thereto.

BACKGROUND OF THE INVENTION

Field of the Invention

The present invention relates to a hitch assembly, and more particularly relates to a hydraulic hitch positioning system for positioning a hitch of a pulled device relative to a pulling vehicle.

Description of the Prior Art

It is known that towing devices or pulled devices, such as trailers, are commonly used behind vehicles or pulling vehicles for transporting goods, equipment, or other materials. Towing the pulled device behind the pulling vehicle becomes challenging when maneuvering in tight spaces or when the pulled device needs to be positioned in a specific orientation relative to the pulling vehicle.

Several hitch assemblies have been disclosed in the past for positioning a hitch of the pulled device relative to the pulling vehicle. One such example is disclosed in a U.S. Pat. No. 11,369,053, entitled "Implement hitch with variable vertical load" ("the '053 patent"). The '053 patent discloses systems for adjusting the downward vertical force applied to the vehicle frame. An operator adjusts or distributes a vertical downward force that an attached implement applies to the frame of a vehicle towing the implement. A front end of a vertical load member is pivotably coupled to the vehicle frame at a point in front of the rear axle of the vehicle, and a rear end of the vertical load member can be coupled to a hitch attachment assembly, coupled with a towed implement, at a rear end of the vertical load member. An actuator is pivotably coupled with the vertical load member rearward of the vehicle axle, and to the vehicle frame. The vertical load member is raised and lowered using the actuator, which raises and lowers the hitch assembly at the rear, and pivots the vertical load member at the front.

Another example is disclosed in a United States Publication No. 20220210507, entitled "Self-locking hitch assembly" ("the '507 Publication"). The '507 Publication discloses a self-locking actuator mechanism including a floating plate and a linear actuator. The floating plate defines a first slot that includes a first central portion, a first jog extending laterally from a first end of the first central portion, and a second jog extending laterally from a second end of the first central portion. The linear actuator includes a shaft pivotably connected to the floating plate, and is operable to drive the shaft between a first shaft position and a second shaft position to thereby move the self-locking actuator mechanism between a first locking state and a second locking state.

Yet another example is disclosed in a U.S. Pat. No. 7,975,776, entitled "Adjustable towing hitch" ("the '776 patent"). The '776 patent discloses a hitch for towing a trailer behind a vehicle licensed to navigate public roadways. The hitch includes a base member to be coupled adjacent to a tail section of the vehicle, and a first support member portion coupled transversely to the elongated shank and extending outwardly in a direction generally away from the base member. A first arm is telescopically adjustable relative to the support member and supports a first connector provided adjacent to a distal end thereof. The first gimbal connector is cooperable with a first trailer connector to establish a linkage with the first trailer connector. A second support member portion is coupled to the base member and extends outwardly in a direction generally away from the base member. A second connector is supported adjacent to a distal end of the second support member and is also cooperable with a second trailer connector to establish a linkage with the second trailer connector.

Although the above hitch assemblies are useful, they present few problems. For example, the traditional hitch assemblies allow for limited adjustment, often restricting the position of the pulled device to be directly behind the pulling vehicle. The traditional hitch assemblies make it difficult to position the pulled device off to the side of the pulling vehicle. Additionally, traditional hitch assemblies are difficult to operate when the pulled device needs to be retracted to a smaller width to fit through narrow openings. As such, the traditional hitch assemblies do not offer desired level of precision and control.

Therefore, there is a need in the art to provide an improved hydraulic hitch positioning system that allows to adjust the position of the hitch of a pulled device to various positions relative to the pulling vehicle, while also allowing for retraction of the hydraulic hitch positioning system to a narrower width with respect to the pulled device.

SUMMARY OF THE INVENTION

It is an object of the present invention to provide a hydraulic hitch positioning system for positioning a hitch of a pulled device relative to a pulling vehicle.

It is another object of the present invention to provide a hydraulic hitch positioning system that allows the hitch to be positioned at infinite points between the extreme limits of the hydraulic hitch positioning system, enabling the pulled device to be positioned anywhere from directly behind the pulling vehicle to off to either side of the pulling vehicle, while also allowing the hydraulic hitch positioning system to retract to less than the width of the pulled device.

In order to overcome the limitations here stated, the present invention discloses a hydraulic hitch positioning system for positioning a hitch of a pulled device relative to a pulling vehicle. The hydraulic hitch positioning system includes first frames and second frames connected to anchors. The first frames include a first slider or bottom slide. The second frames include a second slider or top slide. The second slider encompasses a hydraulic cylinder and a hitch connecting section. The hydraulic hitch positioning system includes a chain and sprocket assembly connecting the first slider and the second slider. The hydraulic cylinder includes hydraulic lines connected to a hydraulic system of the pulling vehicle.

The operator of the pulling vehicle operates the hydraulic cylinder via the hydraulic system of the pulling vehicle. The pressure on the hydraulic cylinder causes the second slider to move in a first direction, say left direction. The movement of the second slider is transmitted to the first slider through the chain and sprocket assembly, causing the first slider to move in the opposite direction, say to the right direction to the second slider at twice the distance. The arrangement results in a total movement of the hitch connecting section three times for every stroke of the hydraulic cylinder. The hitch connecting section can be positioned at any point between the extreme limits of the hydraulic hitch positioning system or the pulled device, allowing the pulled device to be positioned as desired relative to the pulling vehicle.

In addition, the hydraulic hitch positioning system can be retracted to a width less than the width of the pulled device, enabling the hydraulic hitch positioning system to fit through narrow openings or be more easily stored. Here, the pressure on the hydraulic cylinder is applied on another end to reverse the process in order to retract the hydraulic hitch positioning system.

In one advantageous feature of the present invention, when the operator activates the hydraulic system from the pulling vehicle, pressurized hydraulic fluid is directed to the hydraulic cylinder. Depending on the direction of the pressure, the hydraulic cylinder extends or retracts, causing the hitch connecting section to move accordingly. The operator adjusts the position of the hitch connecting section to position the pulled device directly behind the pulling vehicle for straight-line towing or off to either side for maneuvering in tight spaces. The hydraulic hitch positioning system offers precise control over the hitch position, allowing the operator to achieve the desired towing configuration with ease.

These and other objects of the present invention will be apparent from review of the following specification and the accompanying drawings.

BRIEF DESCRIPTION OF THE DRAWINGS

The present invention will now be described in detail with reference to the drawings, which are provided as illustrative examples of the invention to enable those skilled in the art to practice the invention. It will be noted that throughout the appended drawings, like features are identified by like reference numerals. Notably, the FIGUREs and examples are not meant to limit the scope of the present invention to a single embodiment, but other embodiments are possible by way of interchange of some or all of the described or illustrated elements and, further, wherein.

DETAILED DESCRIPTION OF THE PREFERRED EMBODIMENT

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed hydraulic hitch positioning system. However, it will be apparent to those skilled in the art that the presently disclosed invention may be practiced without these specific details. In some instances, well-known structures and devices are shown in functional or conceptual diagram form in order to avoid obscuring the concepts of the presently disclosed hydraulic hitch positioning system.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a hydraulic hitch positioning system, it is to be further understood that numerous changes may arise in the details of the embodiments of the device. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

Various features and embodiments of a hydraulic hitch positioning system are explained in conjunction with the description of FIGS. 1A-3.

Figures 1A, 1B:
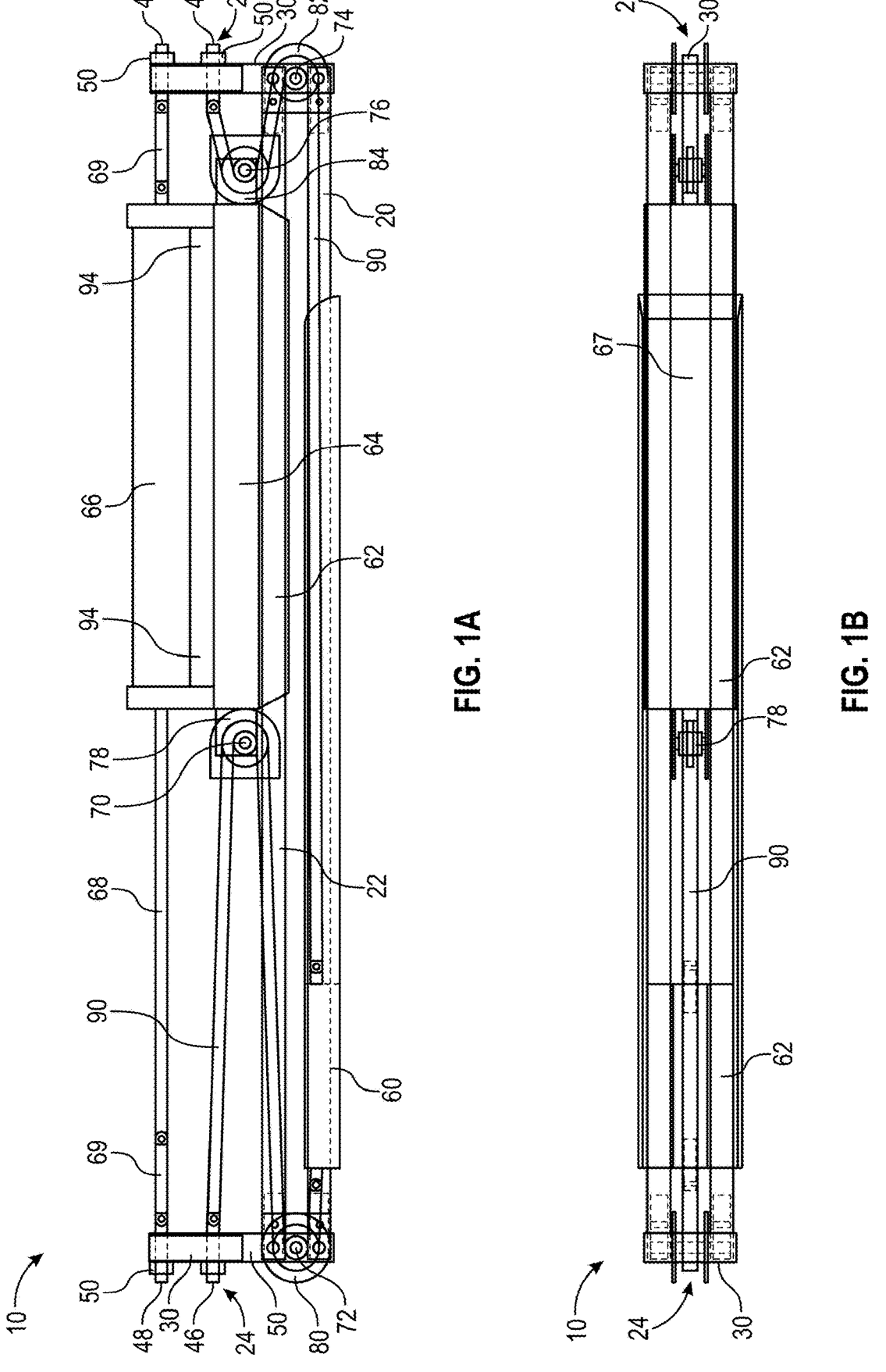
FIG. 1A and FIG. 1B illustrate a front view and a top view, respectively, of the hydraulic hitch positioning system, in accordance with one embodiment of the present invention.

FIG. 1A and FIG. 1B show a front view and a top view, respectively, of a hydraulic hitch positioning system 10, in accordance with one embodiment of the present invention. It should be understood that FIG. 1A and FIG. 1B show hydraulic hitch positioning system 10 in a fully retracted position. Hydraulic hitch positioning system 10 mounts to a pulled device (not shown). Here, the pulled device indicates a towed vehicle. Examples of the pulled device includes, but not limited to, trailers, campers, boats, equipment. The pulled device connects to a pulling vehicle (not shown) via a hitch (not shown). Examples of the pulling vehicle include, but not limited to, cars, trucks, pickup trucks, semi-trucks, and other types of larger vehicles capable of towing various vehicles.

Hydraulic hitch positioning system 10 includes first frames 20, and second frames 22. Each of first frames 20, and second frames 22 indicates an elongated cylindrical or rectangular rod made of a suitable material. Hydraulic hitch positioning system 10 presents a first side 24 and a second side 26. First side 24 indicates a right side and second side 26 indicates a left side, or vice versa of hydraulic hitch positioning system 10. Further, hydraulic hitch positioning system 10 includes a pair of anchors 30, each anchor 30 positioned at first side 24 and a second side 26 of first frames 20 and second frames 22.

Figure 2:
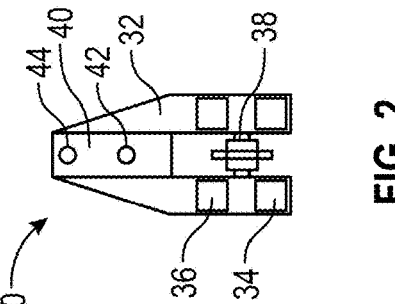
FIG. 2 illustrates a side view of an anchor, in accordance with one embodiment of the present invention.

FIG. 2 shows a side view of anchor 30, in accordance with one embodiment of the present invention. Anchor 30 presents an anchor frame 32 having first frame receiving sections 34 and second frame receiving sections 36. In one example, first frame receiving sections 34 and second frame receiving sections 36 indicate holes for receiving first frames 20, and second frames 22, respectively. As can be seen, first frame receiving sections 34 position at the bottom and receive first frames 20. Second frame receiving sections 36 position above first frame receiving sections 34 and receive second frames 22. Further, anchor 30 includes a sprocket connecting link 38. Sprocket connecting link 38 helps to connect sprockets 72; 74 to anchor frame 32.

At the top, each anchor 30 includes a mounting plate 40. Mounting plate 40 includes a first hole 42 and a second hole 44. First hole 42 and second hole 44 help to connect first connecting rod 46 and second connecting rod 48, respectively, to anchors 30 via fastening members 50 such as nuts. Here, first connecting rod 46 draws through first hole 42 and connects to mounting plate 40 with the help of fastening member 50. Similarly, second connecting rod 48 draws through second hole 44 and connects to mounting plate 40 with the help of fastening member 50.

Referring back to FIG. 1A and FIG. 1B, hydraulic hitch positioning system 10 presents a first slider or bottom slide 60. First slider 60 mounts at first frames 20. In the present invention, first slider 60 indicates a bottom slider. Further, hydraulic hitch positioning system 10 presents a second slider or top slide 62. Second slider 62 mounts at second frames 22. Here, second slider 62 indicates a top slider. Each of first slider 60 and second slider 62 is configured to slidably operate between the extreme ends i.e., first side 24 and second side 26 such that the pulled device can be positioned anywhere from behind the pulling vehicle to off to either side of the pulling vehicle. Second slider 62 includes a hitch connecting section or hitch attachment point 64. Hitch connecting section 64 connects to the hitch and help to operate or slide hydraulic hitch positioning system 10 as desired by an operator of the pulling vehicle. In accordance with the present invention, hitch connecting section 64 includes a hydraulic cylinder 66. Hydraulic cylinder 66 mounts at a cylinder mounting section 67 positioned above hitch connecting section 64, as can be seen from FIG. 1A. Hydraulic cylinder 66 includes a piston rod 68 at one end. Here, hydraulic cylinder 66 connects to second connecting rods 48 via connecting links 69. Connecting links 69 indicate chain links that are short in length and are used to connect to hydraulic cylinder 66 to anchor 30 via second connecting rods 48. As can be seen from FIG. 1A, it is possible to provide one or more hydraulic cylinders 66 on cylinder mounting section 67.

Further, hydraulic hitch positioning system 10 encompasses a plurality of sprockets with shields. In the present invention, hitch positioning system 10 encompasses a first sprocket 70, a second sprocket 72, a third sprocket 74, a fourth sprocket 76. As can be seen from FIG. 1A, first sprocket 70 and fourth sprocket 76 position adjacent to second slider 62. Second sprocket 72 and third sprocket 74 positions at sprocket connecting links 38 at first side 24 and second side 26, respectively at anchors 30. Each of first sprocket 70, second sprocket 72, third sprocket 74, fourth sprocket 76 includes a shield for protecting the respective sprocket assembly. As such, first sprocket 70, second sprocket 72, third sprocket 74, fourth sprocket 76 includes a first shield 78, second shield 80, third shield 82 and fourth shield 84, respectively.

As can be seen from FIG. 1A, hydraulic hitch positioning system 10 includes a roller chain 90. Roller chain 90 extends from first connecting rod 46 at first side 24 and passes through first sprocket 70, second sprocket 72, third sprocket 74, fourth sprocket 76, and connects to first connecting rod 46 at the opposite anchor 30 at second side 26, as shown in FIG. 1A. Roller chain 90 and sprockets 70, 72, 74, 76 form a chain and sprocket assembly.

Further, hydraulic cylinder 66 includes hydraulic lines 68. The hydraulic lines 68 connect to hydraulic cylinder 66 at connecting points 94, as shown in FIG. 1A. In one example, connecting points 94 position at distal ends of hydraulic cylinder 66. In the present invention, the hydraulic lines extend from hydraulic cylinder 66 and connect to a hydraulic system (not shown) of the pulling vehicle such that hydraulic hitch positioning system 10 can be controlled by the operator of the pulling vehicle.

Figure 3:
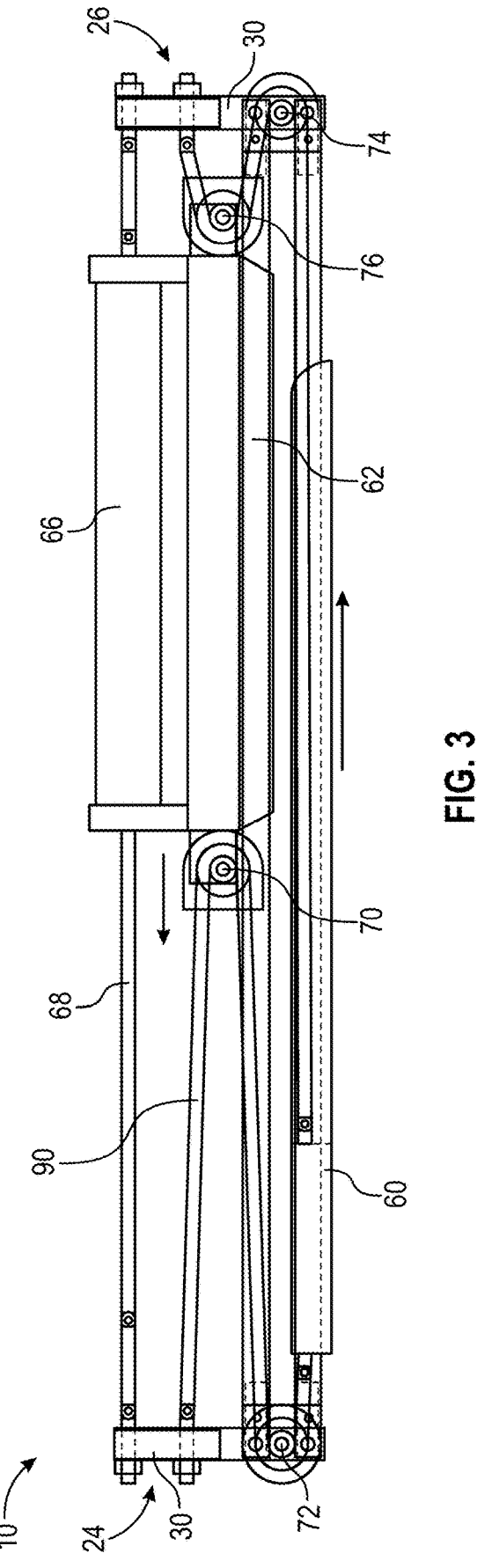
FIG. 3 illustrates an operational schematic view of the hydraulic hitch positioning system, in accordance with one embodiment of the present invention.

Now referring to FIG. 3, the operation of hydraulic hitch positioning system 10 is explained, in accordance with one embodiment of the present invention. It should be understood that FIG. 3 presents hydraulic hitch positioning system 10 in a retracted configuration. As specified above, the hydraulic lines connect to the hydraulic system of the pulling vehicle. Here, the operator operates the hydraulic system such that hydraulic pressure is supplied to hydraulic cylinder 66 via the hydraulic lines. As can be seen from FIG. 3, when the pressure is applied via the hydraulic line on one end, say left end of hydraulic cylinder 66, then hydraulic cylinder 66 moves second slider 62 consisting of hitch connecting section 64 and hydraulic cylinder 66. Here, roller chain 90 on the second side 26 extends towards left side i.e., first side 24 while pulling first slider 60 to move to right side i.e., second side 26 as far as second slider 62 moves to the left. It should be understood that the movement of first slider 60 causes the bottom section of roller chain 90 on the left to pull slack from the top two sections i.e., at second frames 22 and first connecting rods 46 keeping constant tension on roller chain 90. In other words, hydraulic hitch positioning system 10 causes hydraulic cylinder 66 to move the top second slider 62 causing the chain and sprocket assembly to move the bottom first slider 60 in the opposite direction twice as far as the top second slider 62 movement for a total movement of three times the cylinder stroke. This results in the total hydraulic hitch positioning system 10 to extend three times from its retracted configuration for the stroke of hydraulic cylinder 66.

In order to move first slider 60 from second side 26 to first side 24, the pressure is applied via the hydraulic line on another end, say right end of hydraulic cylinder 66, then hydraulic cylinder 66 moves to second slider 62 consisting of hitch connecting section 64 and hydraulic cylinder 66 to the left/first side 24. A person skilled in the art understands that reversing the pressure on hydraulic cylinder 66 reverses the above process and retracts hydraulic hitch positioning system 10 to its original position, as shown in FIG. 3.

The pressure at which hydraulic cylinder 66 is applied determines the speed at which first slider 60 moves from first side 24 to second side 26, or vice versa. For example, the operator can operate hydraulic hitch positioning system 10 to allow the hitch to be positioned at infinite/multiple points between the extreme limits of hydraulic hitch positioning system 10 as needed so that the pulled device can be positioned anywhere from directly behind the pulling vehicle to off to either side of the pulling vehicle. Further, the operator can operate the hydraulic hitch positioning system 10 to retract to less than the width of the pulled device such that the pulled device can maneuver in narrow spaces.

The presently disclosed hydraulic hitch positioning system presents several advantages over prior art. The hydraulic hitch positioning system allows the hitch attachment point to be positioned at any point between the extreme limits of the hydraulic hitch positioning system, enabling the pulled device to be positioned as needed relative to the pulling vehicle. Further, the hydraulic hitch positioning system offers improved maneuverability in tight spaces and allows for easier loading and unloading. The hydraulic hitch positioning system includes hydraulic lines connected to the pulling vehicle. This allows the operator of the pulling vehicle to control the position of the hitch from the driver's seat, providing a user-friendly and efficient way to maneuver the pulled device.

A person skilled in the art appreciates that the hydraulic hitch positioning system may come in a variety of sizes depending on the need and comfort of the operator. Further, different materials in addition to or instead of materials described herein may also be used and such implementations may be construed to be within the scope of the present invention. Further, many changes in the design and placement of components may take place without deviating from the scope of the presently disclosed hydraulic hitch positioning system.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

I claim:

1. A hydraulic hitch positioning system for positioning a hitch of a pulled device relative to a pulling vehicle, said hydraulic hitch positioning system comprising:

first frames connected to anchors;

a first slider connecting said first frames, wherein said first slider is configured to slidably operate along the length of said first frames;

second frames connected to said anchors, wherein said second frames position above said first frames;

a second slider connecting said second frames, wherein said second slider is configured to slidably operate along the length of said second frames;

a hydraulic cylinder that connects to said second slider, wherein said hydraulic cylinder operatively connects to said pulling vehicle via a hitch connecting section; and a chain and sprocket assembly connecting said first slider and said second slider, wherein said hydraulic cylinder is operated at one end causing said second slider to move in a first direction such that movement of said second slider is transmitted to said first slider through said chain and sprocket assembly which in turn causes said first slider to move in an opposite and second direction to said first direction of the second slider at twice the distance for positioning said pulled device behind said pulling vehicle to a side of said pulling vehicle, and wherein a single stroke of said hydraulic cylinder causes said hydraulic hitch positioning system to extend a total distance of three times the stroke of said hydraulic cylinder from its retracted configuration.

2. The hydraulic hitch positioning system of claim 1, wherein said hydraulic cylinder comprises hydraulic lines connected to a hydraulic system of said pulling vehicle.

3. The hydraulic hitch positioning system of claim 1, wherein said hitch connecting section is positioned at any point between distal ends of said pulled device, allowing said pulled device to be positioned relative to said pulling vehicle.

4. The hydraulic hitch positioning system of claim 1, wherein said hydraulic cylinder is operated at another end causing said hydraulic hitch positioning system to retract to its original position.

5. The hydraulic hitch positioning system of claim 1, wherein said hydraulic cylinder is operated at another end to cause said second slider to move in said second direction such that movement of said second slider is transmitted to said first slider through said chain and sprocket assembly causing said first slider to move in said first direction opposite to said second direction of the second slider by twice the distance.

6. The hydraulic hitch positioning system of claim 5, wherein said hydraulic hitch positioning system is retracted to a width less than the width of said pulled device, enabling said hydraulic hitch positioning system to fit through narrow openings or for storing said hydraulic hitch positioning system.

7. The hydraulic hitch positioning system of claim 1, wherein said chain and sprocket assembly comprises a roller chain, and sprockets.

8. The hydraulic hitch positioning system of claim 7, wherein said sprockets are positioned adjacent to said hitch connecting section and at sprocket connecting links connecting said anchors.

9. The hydraulic hitch positioning system of claim 7, wherein each of said sprockets comprises a shield for protecting respective sprocket.

10. The hydraulic hitch positioning system of claim 7, wherein said second slider connects to said anchors via first connecting rods.

11. The hydraulic hitch positioning system of claim 10, wherein said roller chain extends from a first connecting rod of first connecting rods at an anchor of said anchors and connects to another first connecting rod at another anchor of said anchors while passing around said sprockets.

12. The hydraulic hitch positioning system of claim 1, wherein said second slider comprises second connecting rods having connecting links, and wherein said connecting links allow said second slider to connect to said anchors.

13. A hydraulic hitch positioning system for positioning a hitch of a pulled device relative to a pulling vehicle, said hydraulic hitch positioning system comprising:

first frames connected to anchors;

a first slider connecting said first frames, wherein said first slider is configured to slidably operate along the length of said first frames;

second frames connected to said anchors, wherein said second frames position above said first frames;

a second slider connecting said second frames, wherein said second slider is configured to slidably operate along the length of said second frames;

a hydraulic cylinder that connects to said second slider, wherein said hydraulic cylinder operatively connects to said pulling vehicle via a hitch connecting section; and a chain and sprocket assembly connecting said first slider and said second slider, wherein said hydraulic cylinder is operated at one end causing said second slider to move in a first direction such that movement of said second slider is transmitted to said first slider through said chain and sprocket assembly which in turn causes said first slider to move in an opposite and second direction to said first direction of the second slider at twice the distance for positioning said pulled device behind said pulling vehicle to a side of said pulling vehicle, wherein a single stroke of said hydraulic cylinder causes said hydraulic hitch positioning system to extend a total distance of three times the stroke of said hydraulic cylinder from its retracted configuration, wherein said hydraulic cylinder is operated at another end causing said hydraulic hitch positioning system to retract, and wherein said hydraulic hitch positioning system is retracted to a width less than the width of said pulled device, enabling said hydraulic hitch positioning system to fit through narrow openings or for storing said hydraulic hitch positioning system.

14. The hydraulic hitch positioning system of claim 13, wherein said hydraulic cylinder comprises hydraulic lines connected to a hydraulic system of said pulling vehicle.

15. The hydraulic hitch positioning system of claim 13, wherein said hitch connecting section is positioned at any point between distal ends of said pulled device, allowing said pulled device to be positioned relative to said pulling vehicle.

16. The hydraulic hitch positioning system of claim 13, wherein said chain and sprocket assembly comprises a roller chain and sprockets.

17. The hydraulic hitch positioning system of claim 16, wherein said sprockets are positioned adjacent to said hitch connecting section and at sprocket connecting links connecting said anchors, and wherein each of said sprockets comprises a shield for protecting respective sprocket.

18. The hydraulic hitch positioning system of claim 13, wherein said second slider connects to said anchors via first connecting rods, and wherein said roller chain extends from a first connecting rod of the first connecting rods at an anchor of said anchors and connects to another first connecting rod at another anchor of said anchors while passing around said sprockets.

19. The hydraulic hitch positioning system of claim 13, wherein said second slider comprises second connecting rods having connecting links, and wherein said connecting links allow said second slider to connect to said anchors.

20. A method of providing a hydraulic hitch positioning system for positioning a hitch of a pulled device relative to a pulling vehicle, said method comprising the steps of:

providing first frames connecting anchors;

providing a first slider connecting said first frames, said first slider configured to slidably operate along the length of said first frames;

providing second frames connecting said anchors, said second frames positioning above said first frames;

providing a second slider connecting said second frames, said second slider configured to slidably operate along the length of said second frames;

providing a hydraulic cylinder that connects to said second slider, said hydraulic cylinder operatively connecting to said pulling vehicle via a hitch connecting section;

providing a chain and sprocket assembly connecting said first slider and said second slider;

operating said hydraulic cylinder at one end causing said second slider to move in a first direction such that movement of said second slider is transmitted to said first slider through said chain and sprocket assembly causing said first slider to move in an opposite and second direction to said first direction of the second slider at twice the distance; and extending said hydraulic hitch positioning system from its retracted configuration a total distance of three times the stroke of said hydraulic cylinder for a single stroke of said hydraulic cylinder.

* * * * *